PLURAL CHANNEL SERVO SYSTEMS

Filed Sept. 5, 1958

Inventor

DENNIS LELLO MEREDITH

By

Moore & Hall

Attorneys 3,054,039
PLURAL CHANNEL SERVO SYSTEMS
Dennis Lello Meredith, Westall, Montpellier Parade, Cheltenham, England
Filed Sept. 5, 1958, Ser. No. 759,360
Claims priority, application Great Britain Sept. 5, 1957
13 Claims. (Cl. 318—489)

The present invention relates to servo systems of the kind having a plurality of independent sub-channels actuating a common output in accordance with a common demand quantity. Such systems may be used where a large margin of safety is required, for example, in the actuation of aircraft control surfaces, so that a failure of one sub-channel does not put the system out of action or cause incorrect control movements to be applied.

According to the present invention, in a servo system of the kind referred to there are provided a plurality of sub-channels, some of which at least each comprise a variable-gain amplifier to the input of which a signal representing the demand quantity is applied, a servomotor energised by the output of the amplifier, a comparator to give an output in accordance with the discrepancy between the output of the amplifier and a master value for the outputs of all the amplifiers, and means to vary the gain of the amplifier in dependence upon the discrepancy in a sense to reduce the said discrepancy to zero. The master value may be the median (that is to say, the middle one) or the mean value of the outputs of all the amplifiers, in which case all the sub-channels will have a variable gain amplifier as specified above.

Alternatively, the master value may be the value of the output of the amplifier of one sub-channel, the said amplifier having a fixed gain, and the amplifiers of all the other sub-channels having a gain varied as specified above.

From the foregoing, it will be apparent that the term "master value for the outputs of all the amplifiers" means a value which is dependent on the output of at least one of the amplifiers and is selected to serve as a value common to all the amplifiers with which the outputs of the individual amplifiers can be compared. This definition is to be understood to apply to this term as used throughout this specification, including the appended claims.

The amplifiers are preferably electric amplifiers and the motors electric motors.

Each amplifier may conveniently comprise two stages in cascade, the first stage having a gain variable in accordance with an electric control signal applied thereto and the second with a fixed gain.

Where, as usually will be the case, the demand signal may change its sign or phase the comparator output is combined, in a sign (or phase) sensitive device with the demand signal, preferably after amplification by the first amplifier stage, to derive a control signal of appropriate sense for application to the first amplifier stage.

Conveniently the output from the comparator is also applied directly, after limitation, to the input of the second amplifier stage.

In one form of the invention a negative feed-back signal in accordance with the output of the associated motor is applied directly to each amplifier.

In an alternative form of the invention such a negative feed-back signal is applied to each amplifier through a further variable gain amplifier, a further comparator being provided to give an output in accordance with the discrepancy between the output of the further amplifier and the median or mean of the outputs of all the further amplifiers, and means are also provided to vary the gain in accordance with the discrepancy in a sense to reduce the discrepancy to zero.

The present invention is an improvement on the disclosure in pioneer U.S. Patent No. 2,686,285 to F. W. Meredith and F. R. Milsom, granted August 10, 1954, for Multiple Channel Safety Control for Automatic Aircraft Pilots.

Embodiments of the invention will now be described with reference to the accompanying drawings, of which:

Figure 1:
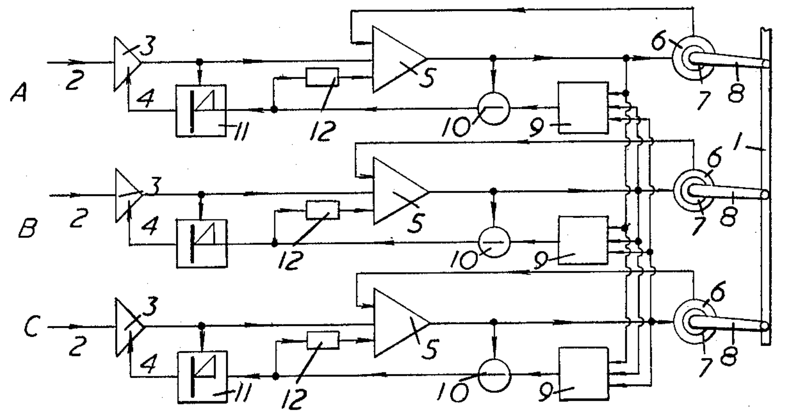
FIGURE 1 shows a schematic drawing of an embodiment of a first form of the invention.

Referring to FIGURE 1, the system there shown has three identical sub-channels, indicated at A, B and C, only one of which, that indicated at A, is it necessary to describe in detail.

The system positions an output member 1 (which in its turn may, for example, position directly or indirectly the control surface of an aircraft) in accordance with some quantity, for example, deviation of the aircraft attitude or its rate of change, or the sum of multiples of these quantities from some datum value, which gives rise to three nominally-equal but independently-derived demand signals (for example, from three similar independent sets of attitude and/or rate responsive gyroscopes) appearing on the lines indicated at 2.

The demand signal for sub-channel A is applied to the input of an amplifier stage 3 whose gain may be varied, from a datum value, by a direct voltage applied to line 4. The output of the stage 3 is applied to one input of an amplifier stage 5, of fixed gain. The output of this stage is applied to an electric servo motor 6, and feed-back signals, e.g. position and/or rate signals and filtered versions of them, derived from the motor output, are fed back to another input of amplifier 5. It will be appreciated that the components as so far described constitute a straightforward position control servo.

The motor output shaft is coupled through an electrically-energised clutch and a set-up spring device 7 either directly or through gearing to an arm 8 which in its turn is connected to output member 1 which is in the form of an actuation link. Set-up spring device 7 has two parts spring-loaded together so that as long as the transmitted torque is below some predetermined value there is no relative displacement between them but if this torque is exceeded the parts can move with respect to each other relatively freely. An electric switch is incorporated in the device and is arranged in known manner to be operated by relative displacement of the two parts.

The output of all the amplifiers 5 is applied to an electric median selector circuit 9, which produces an output signal equal to the median (that is to say, the middle one) of the input signals applied thereto. The output of median selector 9 is applied to one input of a differential 10, to the other input of which the output of the amplifier 5 of sub-channel A is applied. The output of differential 10 is applied to one input of a phase-sensitive demodulator 11, whose direct voltage output is applied to the gain control line, 4, associated with amplifier stage 3. The maximum variation of gain of amplifier 3 can be obtained for a relatively small misalignment between the output of amplifier 5 and the median of all the outputs. It is so arranged that if there is a discrepancy between the output of the amplifier 5 of this sub-channel and the median the amplifier gain is varied from its datum value by the output voltage from demodulator 11 in such a sense as to tend to reduce this discrepancy to zero.

The output of differential 10 is also applied, through a limiter 12, directly to the input of amplifier 5. This feed-back (together with the corresponding feed-back in the other sub-channels) assists in counteracting the effect of datum errors in the various servo feed-back generators and amplifiers, and also in counteracting the effect of datum drift in the devices giving rise to the demand signals. This feed-back is such that it is capable of transmitting "runaway" signals from one channel to the others; and the purpose of limiters 12 is so to limit such transmission that the consequences of a runaway in one channel are not catastrophic, and they should be set accordingly. These limiters should be such that they can only fail in the sense of lowering the set limit, never of increasing it.

It will be appreciated that the feed-back applied to amplifier stages 3 can only modify existing demand signals and cannot introduce spurious demand signals. The saturation output of demodulators 11 is fixed at a value which ensures that the range of gain control exerted is limited to that required to suppress the effect of normal differences between the sub-channels.

It will be appreciated that normally the whole system is continuously self-checking, since a stage of substantial balance of the output torques can only be maintained if all components are operating within prescribed limits of accuracy and failure to maintain that balance would result in the operation of the torque switch associated with the channel concerned.

However, faults which may occur are as follows:

(i) Failure involving expansion of the limits on the gain control signals to amplifiers 3. This would cover up an undesirable deterioration of performance of other components.

(ii) Failure to maintain the limits on limiters 12. This would render the system vulnerable to a runaway.

(iii) Partial or complete loss of torque in one sub-channel.

(iv) Loss of gain of amplifier stages 5.

(v) A runaway in one sub-channel.

(vi) A seized up transmission between a motor 6 and its output clutch.

(i) and (ii) could be dealt with fairly readily. In particular, (ii) can be dealt with by the modification shown in FIGURE 2 (described below). (iii) and (iv) can be dealt with by periodically applying a test demand signal, slightly greater than that required to give a torque sufficient to operate the associated torque switch, to the input of the amplifier 5 of a sub-channel under test, the other demand inputs being momentarily disconnected. Operation of the torque switch would then indicate adequate amplifier and motor performances. (v) would result, if irreversible drives were used to prevent any servo motor back driving the others, in the immediate opening of the associated torque switch, which could be utilised in normal operating conditions (i.e. conditions other than those contemplated when testing for faults (iii) and (iv) above) to de-clutch the runaway sub-channel. If irreversible drives were not used, the system would accelerate up to the speed permitted by the rate feed-backs in the sound sub-channels. This speed having been reached, all the torque developed by the runaway motor would be transmitted through the torque switch (none being used in accelerating the motor) and the switch would operate. This sequency of events should occupy a very short time, so that the disturbance to the output should be negligible. (vi) would result in the opening of the associated torque switch, and the de-clutching of the channel.

It will be appreciated that the number of failures which could be tolerated for the continuance of normal functioning would be two less than the number of channels. An additional fault might produce, according to type, either reduced efficiency or disconnection of the control system, but not a "runaway."

In the system shown in FIGURE 1, the feed back paths from the differentials 10 to the inputs of the amplifiers 5 through the limiters 12 is provided, as described previously to assist in counteracting the effect of datum errors in the various servo feed back generators and amplifiers and also the effect of datum drift in the devices giving rise to the demand signals. Further, as was also mentioned previously, this arrangement may render the system vulnerable to a runaway fault should there be a failure such that the limiting action of the limiters 12 is not maintained. In some circumstances it may be desirable to preclude this and a modified arrangement such as that shown in FIGURE 2 may be employed for this purpose. This will now be described with reference to FIGURE 2 which shows only the input lines 2, the pre-amplifiers 3, and the amplifiers 5 of the system shown in FIGURE 1, the remaining elements 4, 6, 7, 8, 9, 10, and 11 being included and connected as shown in FIGURE 1 but the limiters 12 being omitted.

Figure 2:
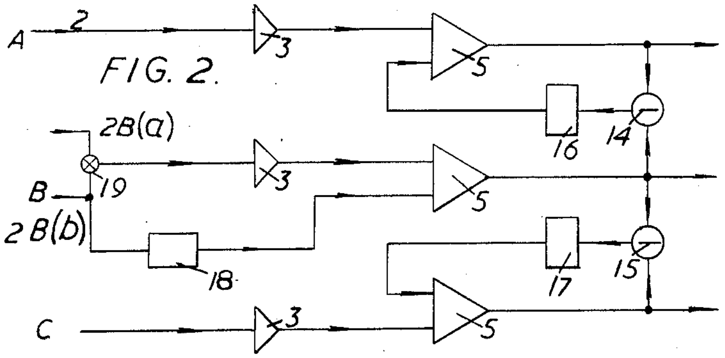
FIGURE 2 shows one manner in which the embodiment of FIGURE 1 may be modified to reduce the effect of drift and/or datum errors.

As shown in FIGURE 2, the demand signal input to sub-channel B is modified. The input demand may in general be split into two components—a short-term component (which, for example, causes the aircraft control surface to be operated in a manner to damp out unwanted oscillatory motion) and a long-term component (which, for example, ensures that the control surface is operated in such a manner that the aircraft follows a desired flight path). Thus, in sub-channel B a signal representing the integral with respect to time of the long-term component of the demand signal is applied to the input of the amplifier 5 in addition to the other signals. This result is achieved by applying the short-term and long-term demands for this channel separately to the lines 2B(*a*) and 2B(*b*). These lines are connected to the inputs of an adding device, indicated as a differential 19. The sum of these demands, appearing at the output of the differential 19, is applied to the input of the amplifier 3, as in FIGURE 1. The long-term demand is applied to the input of an integrator 18 whose output is applied to the input of the amplifier 5. Thus, any datum errors in this channel are backed off by the output of integrator 18.

The system is further modified, as compared with that of FIGURE 1, in two respects. Firstly, the outputs of amplifiers 5 in sub-channels A and B are applied to the inputs of a differential 14 and their difference applied to the input of amplifier 5 of channel A in a sense to tend to remove the difference. Thus any long-term discrepancy between channels A and B due to datum errors will be backed off by the output of integrator 16. Secondly, the outputs of sub-channels C and B are applied to a differential 15, and their difference integrated by an integrator 17, whose input is applied to the input of amplifier 5 of channel C in a sense to tend to remove any difference.

The system of FIGURE 3 will now be described. In that figure, components essentially identical with components appearing in FIGURE 1 are indicated by the same numerals, and components somewhat similar are indicated by primed numerals, e.g. "9′."

In this system, the outputs of amplifiers 3 are applied to median selector circuits 9′, and the output of each amplifier 3 subtracted from that of the corresponding median selector by a differential 10′, the output of which controls the gain of the amplifier in a manner precisely similar to that described in connection with FIGURE 1. In this system however, the feedback signals are treated in a precisely similar manner to the demand signals before application to the amplifiers 5 (via differentials 20, in opposition to the amplified demand signals appearing at the outputs of amplifiers 3). The circuits for this purpose are indicated by the dotted rectangle 21, this including for each sub-channel a further variable gain amplifier from which the feed back signal is passed to the differential 20, a comparator giving an output in dependence upon the discrepancy between the output of the further amplifier and a master value for the outputs of all the further amplifiers and means to vary the gain of the further amplifier in dependence upon the discrepancy in a sense to reduce it towards zero.

Figure 3:
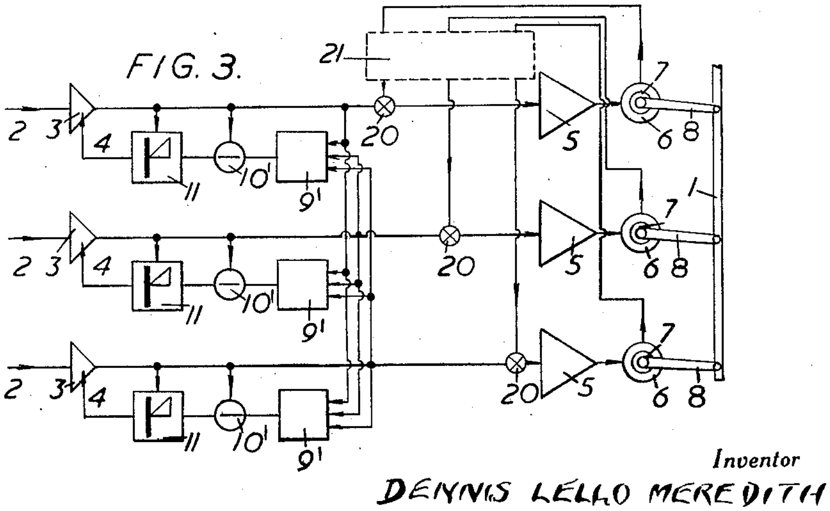
FIGURE 3 shows an embodiment of a second form of the invention.

Datum unbalance between the sub-channels of the embodiment of FIGURE 3 may be corrected by the means shown in either FIGURE 1 or FIGURE 2, and the discussion of faults and possible test procedures in connection with the embodiments of these figures applies.

In all of the embodiments the median selector devices 9, 9′ could be replaced by mean value selectors without substantial disadvantage.

In alternative arrangements, one sub-channel, say sub-channel B, is used as a master. The gain of the amplifier 3 in this channel is kept fixed, and the output from its amplifier 5 is applied to the inputs of the differentials 10 for the other channels in place of the outputs from the median selectors 9, which selectors are thus not required.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A servo system having a plurality of independent sub-channels actuating a common output in accordance with a common demand quantity, each sub-channel comprising a pre-amplifier to the input of which a signal representing the common demand quantity is applied, a main amplifier coupled to the output of the preamplifier and a servo motor energized by the output of the main amplifier and actuating the common output and at least some of the sub-channels also comprising a comparator giving an output in accordance with the discrepancy between the output of the preamplifier and a master value for the output of the pre-amplifiers of all the sub-channels and means to vary the transmission characteristics of the sub-channel by varying the gain of the pre-amplifier in dependence upon the discrepancy in a sense to reduce the said discrepancy to zero.

2. A servo system according to claim 1 in which each sub-channel further comprises means for further varying its transmission characteristics by feeding back to the input of the main amplifier a signal representing the output of the motor, said means comprising a further amplifier through which said signal is passed to the input of the main amplifier, a comparator giving an output in accordance with the discrepancy between the output of the further value and a master value for the outputs of the further amplifiers of all the sub-channels and means to vary the gain of the further amplifier in dependence upon the said discrepancy in a sense to reduce it to zero.

3. A servo system having a plurality of independent sub-channels for actuating a common output in accordance with a common demand quantity, each sub-channel itself being in the form of a servo system comprising an amplifier having at least first and second inputs and an output, a source of signals representing the common demand quantity, means for applying signals from said source to the first input of the amplifier, a servo motor which is coupled to the output of the amplifier to be energized thereby and which actuates the common output, and a feed back signal generator for generating a signal dependent on the output of the sub-channel for feeding back to the second input of the amplifier, at least some of the sub-channels further comprising a comparator for generating an output in accordance with the discrepancy between the output of the sub-channel amplifier and a master value for the outputs of the amplifiers of all the sub-channels and means for varying the transmission characteristics of the sub-channel in dependence upon the comparator output in such a manner as to reduce the discrepancy towards zero.

4. A servo system as claimed in claim 3 in which each said means for varying the transmission characteristics of a sub-channel comprises means for varying the gain of the sub-channel.

5. A servo system as claimed in claim 4 in which each said means for varying the gain of a sub-channel includes a variable gain pre-amplifier forming part of said means for applying signals from said signal source in the sub-channel to the first input of the sub-channel amplifier and means for applying a control signal to the pre-amplifier to vary the gain thereof.

6. A servo system as claimed in claim 5 in which in each sub-channel the comparator output is combined in a sign (or phase) sensitive device with the demand signal, after amplification by the pre-amplifier, to derive a control signal of appropriate sense for application to the pre-amplifier to vary the gain thereof.

7. A servo system as claimed in claim 3 in which in each sub-channel said means for varying the transmission characteristics includes means for generating a feed back signal derived from the comparator output, a further input to the sub-channel amplifier and means for applying said feed back signal to the further input of the amplifier.

8. A servo system as claimed in claim 4 in which in each sub-channel said means for varying the transmission characteristics includes means for generating a feed back signal derived from the comparator output, a further input to the sub-channel amplifier and means for applying said feed back signal to the further input of the amplifier.

9. A servo system as claimed in claim 7 in which said means for applying the feed back signal to the further input of the amplifier comprises a limiter coupled between an output of the comparator and an input to the amplifier.

10. A servo system as claimed in claim 7 in which said means for applying the feed back signal to the further input of the amplifier comprises an integrator coupled between an output of the comparator and an input to the amplifier.

11. A servo system as claimed in claim 3 in which there is an odd number of sub-channels all of which have comparators and means for varying their transmission characteristics and the master value is the median of the outputs of all the amplifiers.

12. A servo system as claimed in claim 3 in which all the sub-channels have comparators and means for varying their transmission characteristics and the master value is the mean value of the outputs of all the amplifiers.

13. A servo system as claimed in claim 3 in which one of the sub-channels is a master sub-channel and in which only the sub-channels other than the master sub-channel have comparators and means for varying their transmission characteristics, the output of the amplifier in the master sub-channel serving as the master value.

References Cited in the file of this patent

UNITED STATES PATENTS

| | | |
|---|---|---|
| 2,760,131 | Braunagel | Aug. 21, 1956 |